United States Patent
Pugh

(10) Patent No.: US 12,497,993 B2
(45) Date of Patent: Dec. 16, 2025

(54) FIXTURING SYSTEM FOR WOODWORKING

(71) Applicant: ToolQuest, LLC, Galena, OH (US)

(72) Inventor: Dennis R. Pugh, Galena, OH (US)

(73) Assignee: ToolQuest, LLC, Galena, OH (US)

( * ) Notice: Subject to any disclaimer, the term of this patent is extended or adjusted under 35 U.S.C. 154(b) by 0 days.

(21) Appl. No.: 18/468,408

(22) Filed: Sep. 15, 2023

(65) Prior Publication Data

US 2024/0001530 A1    Jan. 4, 2024

Related U.S. Application Data

(63) Continuation-in-part of application No. 16/838,284, filed on Apr. 2, 2020, now abandoned.
(Continued)

(51) Int. Cl.
*F16B 37/04*    (2006.01)
*B25H 1/02*    (2006.01)
(Continued)

(52) U.S. Cl.
CPC ............ *F16B 37/045* (2013.01); *B25H 1/02* (2013.01); *B25H 1/08* (2013.01); *F16B 7/187* (2013.01); *F16B 37/0807* (2013.01)

(58) Field of Classification Search
CPC .. F16B 37/0807; F16B 37/145; F16B 37/045; F16B 7/187; B25H 1/08; B25H 1/02; B23Q 1/42; B23Q 3/102
See application file for complete search history.

(56) References Cited

U.S. PATENT DOCUMENTS

| | | |
|---|---|---|
| 3,456,549 A | 7/1969 | Herbert |
| 3,456,706 A | 7/1969 | Raymond, Jr. |
| | (Continued) | |

FOREIGN PATENT DOCUMENTS

| | | | |
|---|---|---|---|
| AU | 2005317883 B2 | 6/2006 | |
| CH | 451656 | 5/1968 | |
| | (Continued) | | |

OTHER PUBLICATIONS

International Search Report issued in PCT/US23/78081, dated Mar. 5, 2024 (2 pages).
(Continued)

*Primary Examiner* — Eret C McNichols
(74) *Attorney, Agent, or Firm* — Thomas Y. Kendrick; Kern Kendrick, LLC

(57) ABSTRACT

A device for use with a wood-based structural element having an outer surface and inner surfaces defining a T-slot, wherein the T-slot has a central section that is open at the outer surface, and has a pair of undercut sections projecting from opposite sides of the central section, and the inner surfaces of the structural element include a pair of inner surfaces facing inward, the device comprising: a T-nut having an outer portion receivable in the central section of the T-slot, a screw-threaded bore, and an inner portion with a pair of clamping surfaces projecting from opposite sides of the outer portion; wherein the bore has a nominal cross-sectional area for receiving a threaded fastener, and the clamping surfaces on the T-nut have a combined surface area of about 10 times the cross-sectional area of the bore; and wherein the T-nut is configured for use with a wood-based structural element.

19 Claims, 14 Drawing Sheets

Related U.S. Application Data

(60) Provisional application No. 62/963,825, filed on Jan. 21, 2020, provisional application No. 62/892,190, filed on Aug. 27, 2019, provisional application No. 62/837,747, filed on Apr. 24, 2019.

(51) Int. Cl.
   *B25H 1/08* (2006.01)
   *F16B 7/18* (2006.01)
   *F16B 37/08* (2006.01)

(56) References Cited

U.S. PATENT DOCUMENTS

| | | |
|---|---|---|
| 3,557,857 A | 1/1971 | Swenson |
| 4,045,010 A | 8/1977 | Arnold |
| 4,708,549 A | 11/1987 | Jensen |
| 4,915,367 A | 4/1990 | Carossino |
| 4,957,402 A | 9/1990 | Klein et al. |
| 4,959,908 A | 10/1990 | Weyrauch |
| 5,060,920 A | 10/1991 | Engibarov |
| 5,199,836 A | 4/1993 | Gogarty |
| 5,509,644 A | 4/1996 | Engibarov |
| 5,704,736 A | 1/1998 | Giannetti |
| 5,820,322 A | 10/1998 | Hermann |
| 5,904,225 A | 5/1999 | Patros |
| 5,984,291 A | 11/1999 | Iwata et al. |
| 6,086,300 A | 7/2000 | Frohlich |
| 6,126,158 A | 10/2000 | Engibarov |
| 6,260,813 B1 | 7/2001 | Whitcomb |
| 6,672,018 B2 | 1/2004 | Shingleton |
| 8,181,926 B2 | 5/2012 | Magno, Jr. |
| 8,182,183 B2 | 5/2012 | Cook |
| 8,557,081 B2 | 10/2013 | Sha |
| D696,574 S | 12/2013 | Caterinacci |
| 9,506,600 B1 | 11/2016 | Li |
| 9,637,933 B2 | 5/2017 | Zhou et al. |
| 9,923,512 B2 | 3/2018 | Martin |
| D817,741 S | 5/2018 | West |
| 10,054,149 B2 | 8/2018 | Hoogstrate |
| 10,451,314 B2 | 10/2019 | Markiewicz |
| 10,605,282 B1 | 3/2020 | Young |
| 10,648,496 B2 | 5/2020 | Oetlinger |
| 10,676,196 B2 | 6/2020 | Pacheco |
| 11,181,211 B1 | 11/2021 | Morgan |
| 11,224,964 B2 | 1/2022 | Wang |
| 11,384,814 B2 | 7/2022 | Rouleau |
| 2007/0215772 A1 | 9/2007 | Nickel |
| 2008/0170917 A1 | 7/2008 | Hilker |
| 2011/0214365 A1 | 9/2011 | Aftanas |
| 2012/0043709 A1 | 2/2012 | Cusumano |
| 2015/0091232 A1 | 4/2015 | Meagher, Jr. |
| 2017/0159697 A1 | 6/2017 | Hoogstrate et al. |
| 2020/0338717 A1 | 10/2020 | Pugh |

FOREIGN PATENT DOCUMENTS

| | | |
|---|---|---|
| CN | 204290843 | 4/2015 |
| FR | 2337301 | 7/1977 |
| GB | 962312 | 7/1964 |
| GB | 2364720 | 8/2000 |
| JP | 2001280317 | 10/2001 |

OTHER PUBLICATIONS

Written Opinion of the International Searching Authority issued in PCT/US23/78081, dated Mar. 5, 2024 (6 pages).
Matchfit Dovetail Hardware Variety Product Sheets, 2020 (6 pages).
International Search Report issued in PCT/US20/27055, mailing date Jul. 17, 2020.
Written Opinion of the International Searching Authority issued in in PCT/US20/27055, mailing date Jul. 17, 2020.
International Preliminary Report on Patentability issued in PCT/US20/27055 on Sep. 28, 2021.

FIXTURING SYSTEM FOR WOODWORKING

CROSS-REFERENCE TO RELATED APPLICATIONS

This application is a continuation-in-part of U.S. patent application Ser. No. 16/838,284, filed Apr. 2, 2020, which claims priority to provisional U.S. Patent App. No. 62/837,747, filed Apr. 24, 2019, provisional U.S. Patent App. No. 62/892,190, filed Aug. 27, 2019, and provisional U.S. Patent App. No. 62/963,825, filed Jan. 21, 2020, each of which is incorporated by reference in its entirety.

BACKGROUND

In woodworking, it is common practice to make jigs and fixtures that incorporate slidably-adjustable anchoring points. This is achieved by creating one or more fixturing slots in a structural element of the jig or fixture. Herein, such structural elements are referred to as "fixturing plates" or "woodworking tables." A fixturing slot is configured to capture a threaded fastener and to constrain it to the locus of positions along the slot.

Three types of fixturing slot are commonly used in woodworking jigs and fixtures. The simplest type of fixturing slot is the "through slot," which is milled completely through the fixturing plate and serves as a clearance slot for a threaded fastener. Although simple, long through slots may weaken the fixturing plate excessively.

Dovetail slots are also used as fixturing slots. These trapezoidal-profile, non-through slots function much like T-slots and may be milled directly into wooden fixturing plates.

The most commonly used type of fixturing slot is the "T-slot." This is a non-through slot that captures a nut or a bolt head within the thickness of the fixturing plate. The most common way to create a T-slot in a woodworking jig or fixture is to inlay extruded-aluminum T-track into the surface of a fixturing plate constructed from a wood-based material. This method has the advantage of providing a relatively high-strength material for captured fasteners to bear upon, enabling the use of common fasteners that are designed for securing metal components. However, there are several downsides to metal T-track. T-track is typically secured to the fixturing plate with countersunk wood screws. When the fixturing plate is made from a relatively thin sheet material such as plywood (typically, 18 mm thick), these mounting screws must be very short. This limits the clamping force that can be applied without pulling the T-track out of fixturing plate. T-track extrusions are relatively expensive and require a significant amount of installation labor. Creating a two-dimensional grid of intersecting metal T-track is difficult and expensive, and the many short sections of T-track exacerbate the pull-out problem.

T-slots may also be milled directly into wood-based fixturing plates, using special router bits. Wood-based materials are structural materials composed primarily of wood fibers. Examples include solid (natural) wood and engineered materials such as plywood, particle board, and fiberboard. Traditional T-slot router bits mill slots that are designed to fit common fasteners such as hex-head bolts or hex nuts. These fasteners were designed for use with metal components, and thus they have relatively small heads with low surface area. To make matters worse, because the fastener is installed in a slot rather than in a round hole, much of the fastener head's clamping surface is not even in contact with the fixturing plate. Such fasteners can easily generate clamping-surface pressures that will crush wood-based materials, making the T-slot unusable, rendering this type of T-slot suitable for only light clamping forces.

What is needed is a combination of T-nut and wooden T-slot ideally suited for wooden surfaces, including fastener and slot geometry enabling far higher clamping forces.

SUMMARY

In one aspect, a device for use with a wood-based structural element is provided, the element having an outer surface and inner surfaces defining a T-slot, wherein the T-slot has a central section that is open at the outer surface, and further has a pair of undercut sections projecting from opposite sides of the central section, and the inner surfaces of the structural element include a pair of inner surfaces facing inward across the pair of undercut sections of the T-slot, the device comprising: a T-nut having an outer portion receivable in the central section of the T-slot, a screw-threaded bore in the outer portion, and an inner portion with a pair of clamping surfaces projecting from opposite sides of the outer portion; wherein the bore has a nominal cross-sectional area for receiving a threaded fastener, and the clamping surfaces on the T-nut have a combined surface area of at least about 10 times the nominal cross-sectional area of the bore; and wherein the T-nut is configured for use with a wood-based structural element.

In another aspect, a device for use with a wood-based structural element is provided, the element having an outer surface and inner surfaces defining a T-slot, wherein the T-slot has a central section that is open at the outer surface, and further has a pair of undercut sections projecting from opposite sides of the central section, and the inner surfaces of the structural element include a pair of inner surfaces facing inward across the pair of undercut sections of the T-slot, the device comprising: a T-nut having an outer portion receivable in the central section of the T-slot, a screw-threaded bore in the outer portion, an inner portion with a pair of clamping surfaces projecting from opposite sides of the outer portion, and a plurality of sockets extending vertically through the T-nut; wherein the outer surface of the structural element is planar, and the clamping surfaces on the T-nut are planar and inclined so as to project inward relative to the outer portion of the T-nut at angles of inclination between 5 degrees and 30 degrees.

BRIEF DESCRIPTION OF THE FIGURES

The accompanying figures, which are incorporated in and constitute a part of the specification, illustrate various example systems and methods and are used merely to illustrate various example aspects. In the figures, like elements bear like reference numerals.

DETAILED DESCRIPTION

Numerous T-slot router bits are commercially available for cutting T-slots directly into wood-based materials. However, the resulting slots are sized for use with conventional threaded fasteners that were designed for fastening metal parts and thus the slots are suitable for light clamping forces only. In the woodworking community, it is widely believed that prior art T-slots machined directly into wood-based materials are too fragile for general fixturing applications. Thus, a long-felt need exists for T-slots that are machined directly into wood-based materials and capable of applying the high clamping forces used in fixturing.

Figure 1:
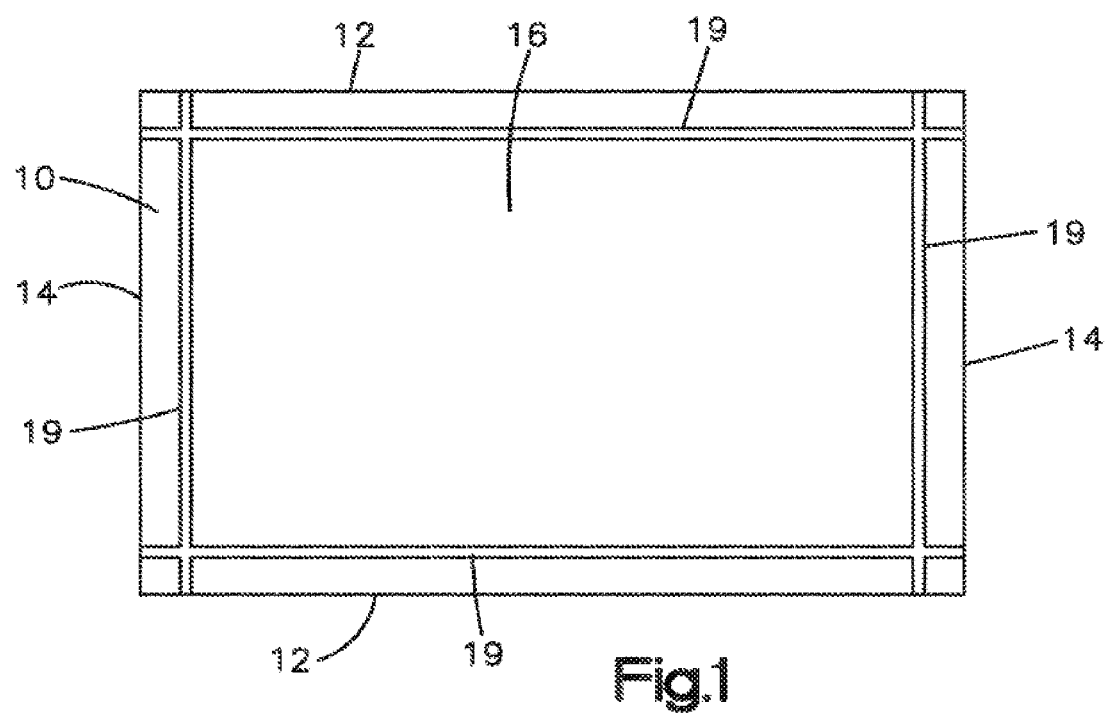
FIG. 1 illustrates a plan view of an example woodworking table 10 including at least one T-slot 19.
Figure 2A:
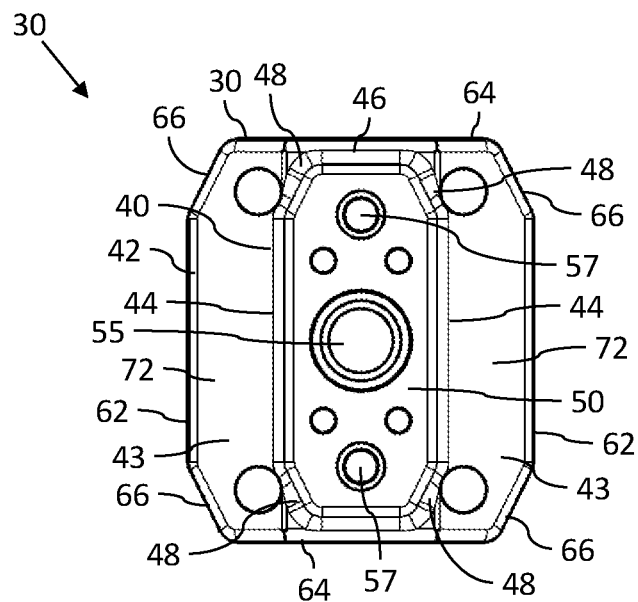
FIG. 2A illustrates a top plan view of a T-nut 30.
Figure 2B:
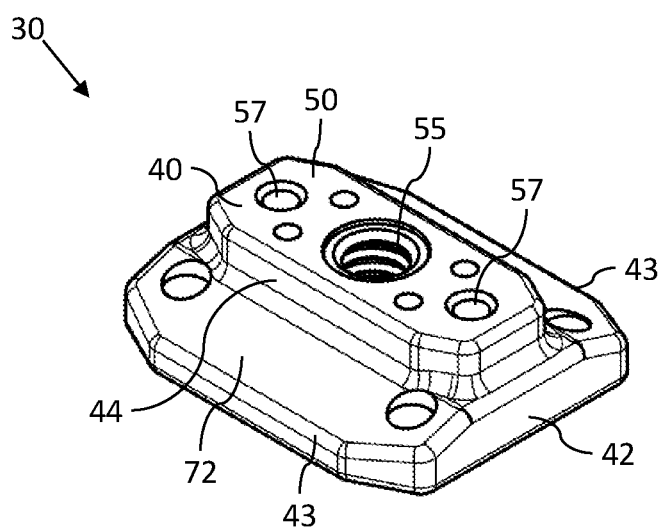
FIG. 2B illustrates an upper perspective view of T-nut 30.
Figure 2C:
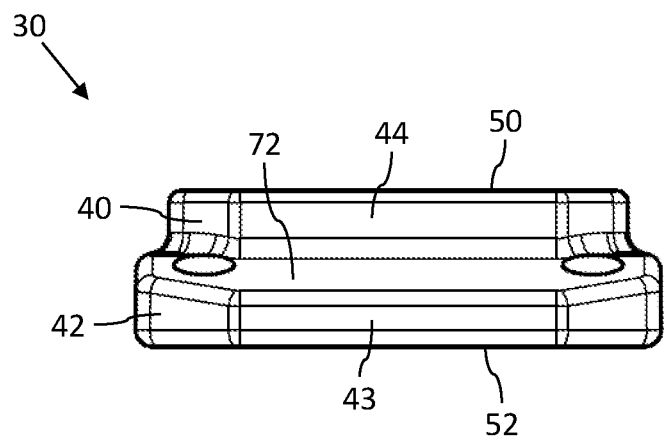
FIG. 2C illustrates a side elevation view of T-nut 30.
Figure 2D:
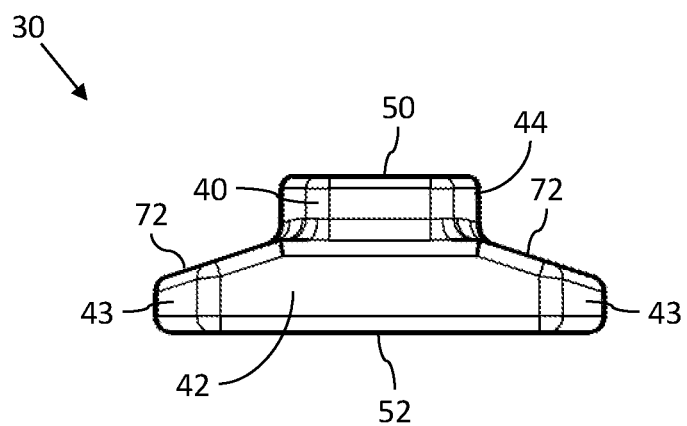
FIG. 2D illustrates a front elevation view of T-nut 30.
Figure 2E:
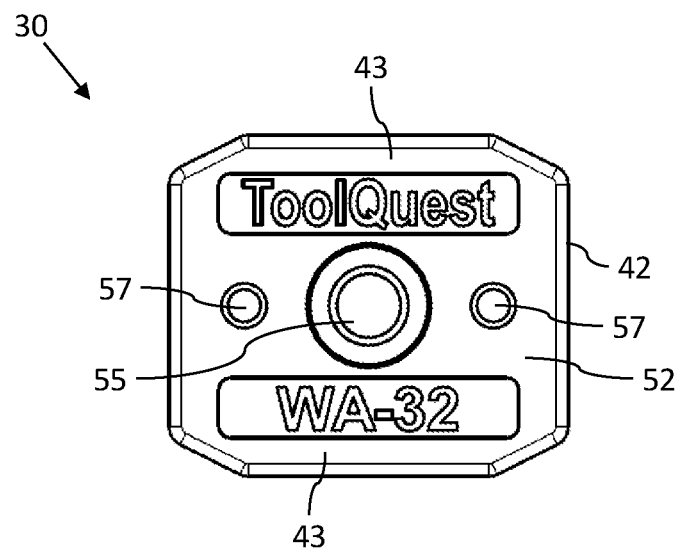
FIG. 2E illustrates a bottom plan view of T-nut 30.
Figure 2F:
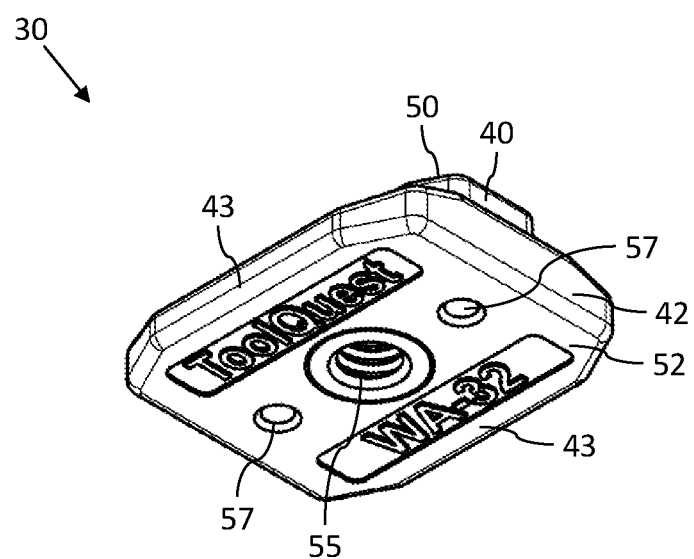
FIG. 2F illustrates a lower perspective view of T-nut 30.

As shown in FIG. 1, an example of a structural element is provided in the configuration of a woodworking table 10. Woodworking table 10 may be a fixturing plate. In this embodiment, table 10 is formed of wood-based material such as, for example, natural wood or engineered materials including plywood, particle board, and fiberboard. Table 10 is formed from a non-metallic material. As shown in FIG. 1, table 10 in this example has a rectangular shape with opposite side edges 12 and opposite end edges 14. Table 10 has a planar top surface 16 and T-slots 19 that are open at top surface 16. In the illustrated embodiment, there are two parallel T-slots 19 reaching across the width of top surface 16 from one side edge 12 to an opposite side edge 12. T-slots 19 are open at the side edges 12. Two more parallel T-slots 19 reach along the length of top surface 16 from one end edge 14 to an opposite end edge 14, and are open at end edges 14. As shown, table 10 in the illustrated example does not contain metal T-tracks. Table 10 may include at least two T-slots 19 that intersect and/or cross one another.

FIGS. 2A-2F illustrate a T-nut 30 for engagement with the one or more T-slot 19. The woodworking system may include a plurality of T-nuts 30. Each T-nut 30 has the configuration shown in FIGS. 2A-2F. Each T-nut 30 has an upper portion or spine 40, and also has a lower portion 42 with clamping wings 43. Spine 40 has an elongated shape with opposite sides 44, opposite ends 46, and beveled corners 48. T-nut 30 has a planar top surface 50 on spine 40. T-nut 30 has a planar bottom surface 52 on lower portion 42.

A screw-threaded bore 55 reaches vertically through at least a portion of a thickness of T-nut 30 from the center of top surface 50 to the center of bottom surface 52. Bore 55 has a nominal cross-sectional area for a screw-threaded shank on a fastener to be screwed into bore 55. Sockets 57 for anti-rotation pins also extend vertically through at least a portion of a thickness of T-nut 30.

Lower portion 42 of T-nut 30 also has an elongated shape with opposite sides 62, opposite ends 64, and beveled corners 66. A pair of clamping surfaces 72 on lower portion 42 of T-nut 30 project laterally away from opposite sides 44 of spine 40. Clamping surfaces 72 are oriented on an angle sloping downwardly from the direction of spine 40 to opposite sides 62 as further described below. Clamping surface 72 are equal in size, with each having a predetermined area.

FIGS. 3A-3F illustrate T-nut 30, and T-slot 19, separate from one another and engaged with one another. Each T-slot includes a central section 80 and a channel 82 beneath central section 80. Central section 80 is open at horizontal top surface 16 of table 10. Central section 80 corresponds to and is slightly larger than, spine 40. Channel 82 has a pair of undercut sections 84 reaching laterally from central section 80. Angled inner surfaces 90 of the table 10 face downward over undercut sections 84 of channel 82. Central section 80 is further laterally defined by inwardly directed faces 83 of T-slot overhangs 85. Overhangs 85 are arranged above, and defined by, undercut sections 84.

Figure 3A:
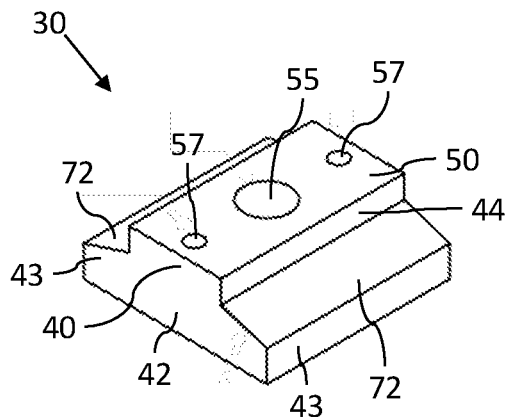
FIG. 3A illustrates an upper perspective view of T-nut 30.
Figure 3B:
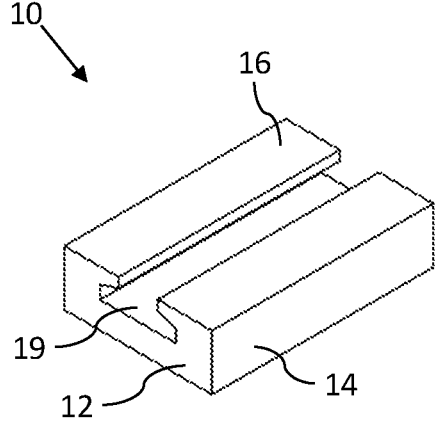
FIG. 3B illustrates an upper perspective view of a portion of woodworking table 10 including T-slot 19.
Figure 3C:
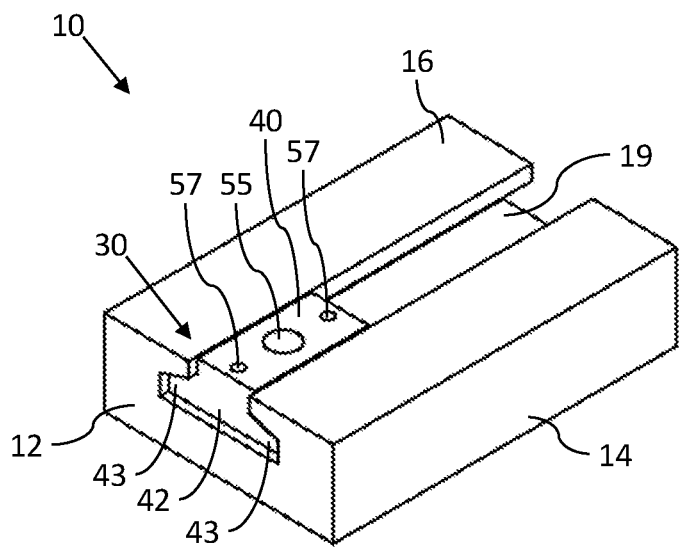
FIG. 3C illustrates an upper perspective view of a portion of woodworking table 10 including T-nut 30 engaged with T-slot 19.
Figure 3D:
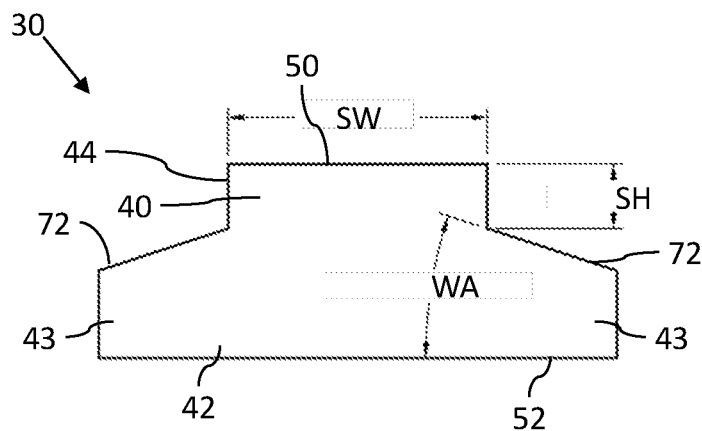
FIG. 3D illustrates a front elevation view of T-nut 30.
Figure 3E:
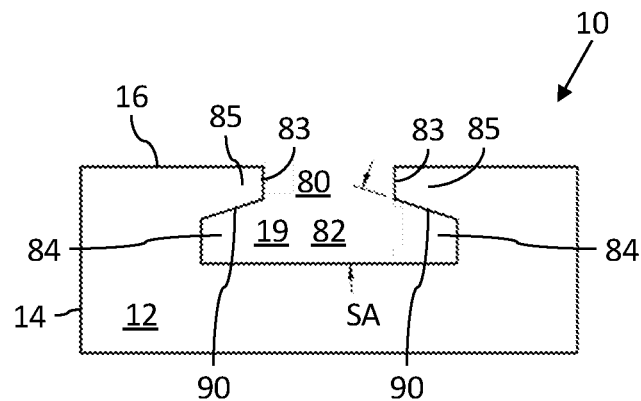
FIG. 3E illustrates a front elevation view of a portion of woodworking table 10 including T-slot 19.
Figure 3F:
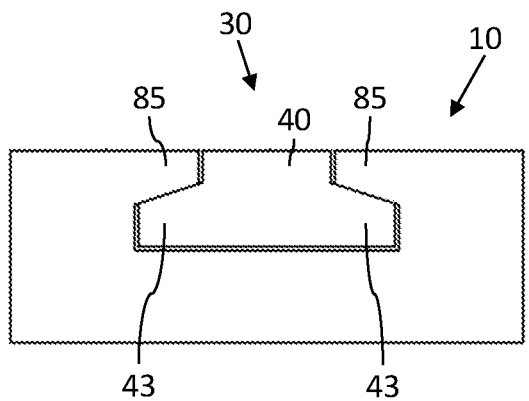
FIG. 3F illustrates a front elevation view of a portion of woodworking table 10 including T-nut 30 engaged with T-slot 19.

Each T-nut 30 is sized and shaped to fit within T-slot 19 as shown in FIGS. 3C and 3F. The width SW of spine 40 is slightly less than the width of the T-slot 19 at central section 80. The width of T-nut 30 at lower portion 42 is slightly less than the width of T-slot 19 at channel 82. The thickness of T-nut 30 between bottom surface 52 and clamping surfaces 72 is slightly less than the height of the T-slot 19 in undercut sections 84 of channel 82. In this configuration, T-nut 30 can be inserted into T-slot 19 through its open end for sliding movement to any desired position along the length of T-slot 19.

T-nut 30 has a pair of clamping surfaces 72 that are oriented at an angle WA relative to bottom surface 52. Clamping surfaces 72 are higher at their end near spine 40, and lower at their end near opposite sides 62. Angle WA may be between about 5 degrees and about 30 degrees. Angle WA may be between about 10 degrees and about 25 degrees. Angle WA may be between about 15 degrees and about 20 degrees. Angle WA may be about 18 degrees. Angle WA is the same as angle SA.

In considering angle WA, the static friction angle (also known as the "angle of friction") is relevant. The static friction angle is the angle, relative to horizontal, of a planar surface at which an object placed thereon will begin to slide. The term "static friction angle" refers specifically to the friction of the T-nut material on the T-slot material. If $\mu$ the static coefficient of friction and $\varphi$ is the static friction angle, then $\mu=\tan(\varphi)$. Angle WA must be small enough for clamping wings 43 to fit vertically within T-nut 30's height budget, while still leaving an adequate T-nut spine height SH above clamping wings 43. Angle WA must be less than or equal to the static friction angle, which ensures that clamping forces do not cause T-nut 30 to wedge open T-slot 19, and thus bend table 10 about the relatively thin section remaining beneath T-slot 19.

T-nut 30's spine 40 must not protrude above top surface 16 of table 10, as that space is reserved for the objects to be clamped (e.g., fixture 410). Thus the minimum height of inwardly directed faces 83 is equal to spine height SH.

Inwardly directed faces 83 serve as linear guides for spine 40 and for various workholding accessories, and must have a minimum thickness that is adequate for this purpose. T-slot 19 may be milled deeper than the overall height of T-nut 30, in which case the thickness of inwardly directed faces 83 will be greater than the minimum.

T-slot 19 has a pair of inner surfaces 90 that engage clamping surfaces 72, and that are oriented at an angle SA relative to a bottom surface of T-slot 19, which is parallel with top surface 16. Inner surfaces 90 are higher at their end near central section 80 and are lower at their laterally outer end. Angle SA may be between about 5 degrees and about 30 degrees. Angle SA may be between about 10 degrees and about 25 degrees. Angle SA may be between about 15 degrees and about 20 degrees. Angle SA may be about 18 degrees. Angle SA is the same as angle WA.

A threaded fastener (e.g., threaded fastener 412) may engage threaded bore 55 to impart a force upon T-nut 30 when T-nut 30 is oriented in T-slot 19. The threaded fastener may be a ¼"-20 threaded fastener, ⁵⁄₁₆"-18 threaded fastener, M6×1 threaded fastener, such as a bolt, screw, or threaded rod. Optimally, the threaded fastener is compatible with standard workholding accessories used in woodworking.

T-nut 30 may have an overall height (including spine 40 and lower portion 42) that is small enough for mating with T-slot 19 machined within an 18 mm (0.7") thick plywood, which is a material commonly used for constructing woodworking jigs and fixtures, while still leaving enough material thickness below T-slot 19 for the required bending stiffness.

Tables 10 are commonly made of a hardwood plywood, nominally 18 mm thick (although often marketed as ¾" thick). The height of T-slot 19, and thus the mating T-nut 30, is limited by the thickness of table 10. As T-slot 19 is milled deeper, the table section remaining beneath T-slot 19 becomes thinner. Given that the bending stiffness of the thin section is proportional to the cube of its thickness, it is important to keep T-slot 19 as shallow as possible.

Wood-based materials have relatively low strength properties, as compared to structural metals. When a woodworking table/fixturing plate is made of wood, it is therefore much more important to minimize the stresses that result from a given clamping force. With the geometry of T-slot 19, the bending moments and shear forces are highest at the roots of T-slot overhangs 85. Angling clamping surfaces 72 of clamping wings 43 increases the root thickness of the corresponding T-slot overhangs 85, which reduces the stresses at the roots without increasing the overall depth of T-slot 19. Angling clamping surfaces 72 of clamping wings 43 also increases the root thickness of clamping wings 43, thereby enabling T-nut 30 to be constructed of lower-strength materials, such as synthetic polymers.

Wing angle WA does not have to be large in order to provide a useful increase in clamping-force capability. A wing angle WA of only five degrees, for example, applied to clamping wings 43 that are ½" wide with a ⅛" tip thickness, increases the root thicknesses of both clamping wing 43 and T-slot overhang 85 by 0.044", or 35%. This provides a 35% increase in shear strength, and an 82% increase in bending strength, of T-nut 30.

T-nut 30 may include an overall height that is large enough for accepting standard machine screw fastener lengths to mount fixtures of arbitrary thicknesses. The fastener must be long enough to pass through the fixture and engage threaded bore 55 sufficiently to retain T-nut 30 loosely for insertion into T-slot 19, but not so long that the threaded fastener extends beyond the bottom of T-nut 30 and jams into the bottom surface of T-slot 19 when tightened.

Thus, T-nut 30 may have an overall height great enough to permit this length of fastener travel. To apply a full clamping force, the threaded fastener must have at least four full threads of engagement with T-nut 30. The minimum overall height of T-nut 30 may be equal to the commercially available machine screw length increment plus the minimum thread engagement distance (four full threads).

In one embodiment, T-nut 30 includes an overall height based upon a ¼"-20 threaded fastener, which is available in length increments of ⅛" (0.125"), and has a thread pitch of 0.05", giving a minimum overall height of T-nut 30 equal to 0.125"+4(0.05")=0.325".

In another embodiment, T-nut 30 includes an overall height based upon a M6×1 threaded fastener, which is available in length increments of 5 mm, and has a thread pitch of 1 mm, giving a minimum overall height of T-nut 30 equal to 5 mm+4(1 mm)=9 mm (0.354").

In another embodiment, T-nut 30 has an overall height of 9.5 mm (0.375") to accommodate tolerance variations.

T-nut 30 may include a spine width SW that is wide enough to house a threaded hole or threaded insert for the chosen fastener diameter(s), with sufficient structural material remaining on each side of the hole or fastener to withstand the longitudinal bending moments induced by the clamp-screw force. In one embodiment, spine width SW is designed to accommodate a ⁵⁄₁₆" outside diameter threaded insert; T-nut 30 may be formed from a glass-fiber reinforced thermoplastic; and spine width SW may be at least about ½" wide. Spine width SW may be limited to about ½" wide in this embodiment to minimize the overall width of T-nut 30 and T-slot 19 (minimizing the width of T-slot 19 may minimize T-slot 19's effect upon the strength of table 10).

In one embodiment, the maximum rated clamp load of ¼"-20 ASTM A307 Grade A machine screw is 859 lb. Certain domestic hardwoods have compressive strengths approaching 2000 psi. Pecan wood, for example, has a compressive strength perpendicular to the grain of 1720 psi (see Wood handbook-Wood as an engineering material, Chapter 4, Mechanical Properties of Wood. U.S. Department of Agriculture, Forest Service, Forest Products Laboratory). To limit the surface pressure to less than 1720 psi at the rated machine-screw clamping force of 859 lb., the minimum clamping area is 859 lb./1720 psi=0.5 in$^2$. This is approximately ten times the nominal cross-sectional area of a ¼" threaded fastener, or synonymously, is a clamping-area ratio of 10:1. To minimize the size of T-nut 30, a nominal clamping area of 0.5 in$^2$ may be selected. When used in wood materials having lower compressive strengths, the applied threaded fastener screw torque and force can be reduced accordingly. In one embodiment, as a compromise between minimizing overall length and overall width, and to roughly equalize lateral and longitudinal stresses under load, T-nut 30 may have a length:width aspect ratio of 1:1.

The total clamping surface area (that is, the area of clamping surfaces 72 of clamping wings 43 that contacts inner surfaces 90 of T-slot overhangs 85) must be large enough that the surface pressure generated by the threaded fastener's screw force is less than the compressive strength of the wooden T-slot material. The maximum threaded fastener screw force is roughly proportional to the nominal cross-sectional area of the threaded fastener (e.g., fastener 412).

T-nut 30 may include an overall length (that is, the distance between opposite ends 64) and an overall width (that is, the distance between opposite sides 62), each of which may be minimized to the extent practical. To minimize the required spacing between T-nuts 30 in the same T-slot 19, the overall length of T-nut 30 should be minimized to the extent practical.

Thus for a given T-slot 19 material, the required clamping surface area is also roughly proportional to the nominal cross-sectional area of the threaded fastener. The total clamping area=(T-nut 30 overall length)×(T-nut 30 overall width–spine width SW). For a T-nut 30 having a length: width aspect ratio of 1:1 and a spine width SW of ½", the clamping surface area is 0.5 in². Where N=overall length of T-nut 30, then 0.5 in²=N×(N–½"). N²–0.5N–0.5=0. Applying the quadratic equation, N={1, –0.5}. As a result, and because the length and width dimension N must have a positive value, T-nut 30's overall width and overall length is 1", which is equal to four times the diameter of the threaded fastener (e.g., fastener 412). Each clamping wing 43 then has a nominal width of (1"-½")/2=¼", which is equal to the diameter of the threaded fastener.

Figure 4A:
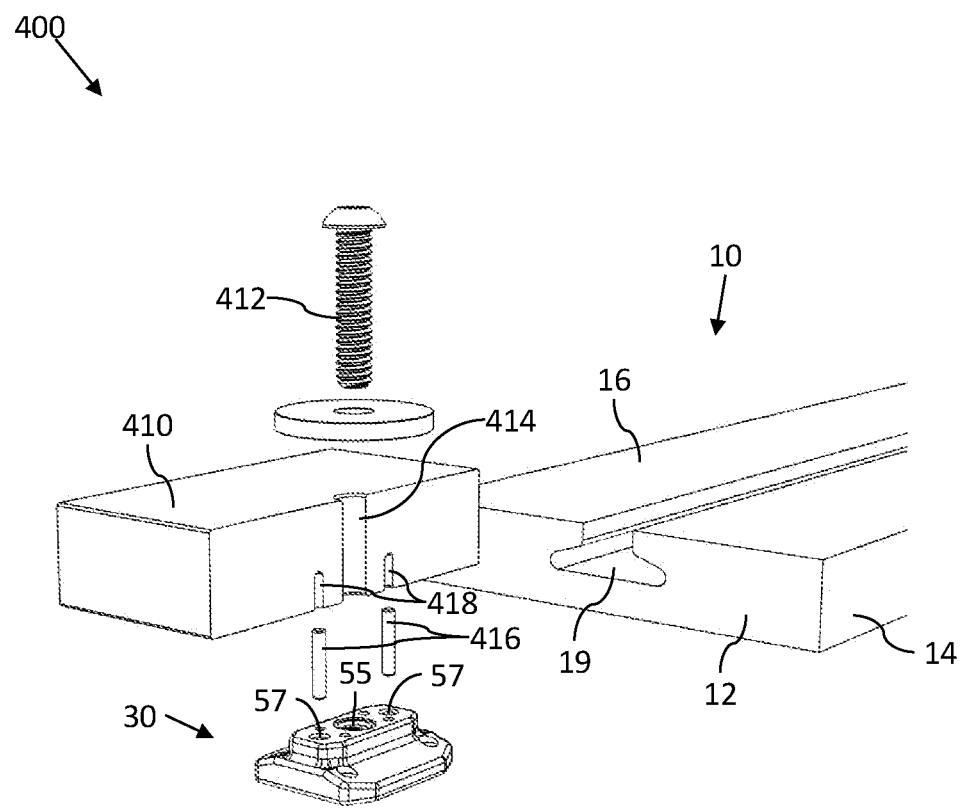
FIG. 4A illustrates an exploded view of a fixture system 400 including a portion of woodworking table 10 including T-nut 30, a fixture 410, and T-slot 19.
Figure 4B:
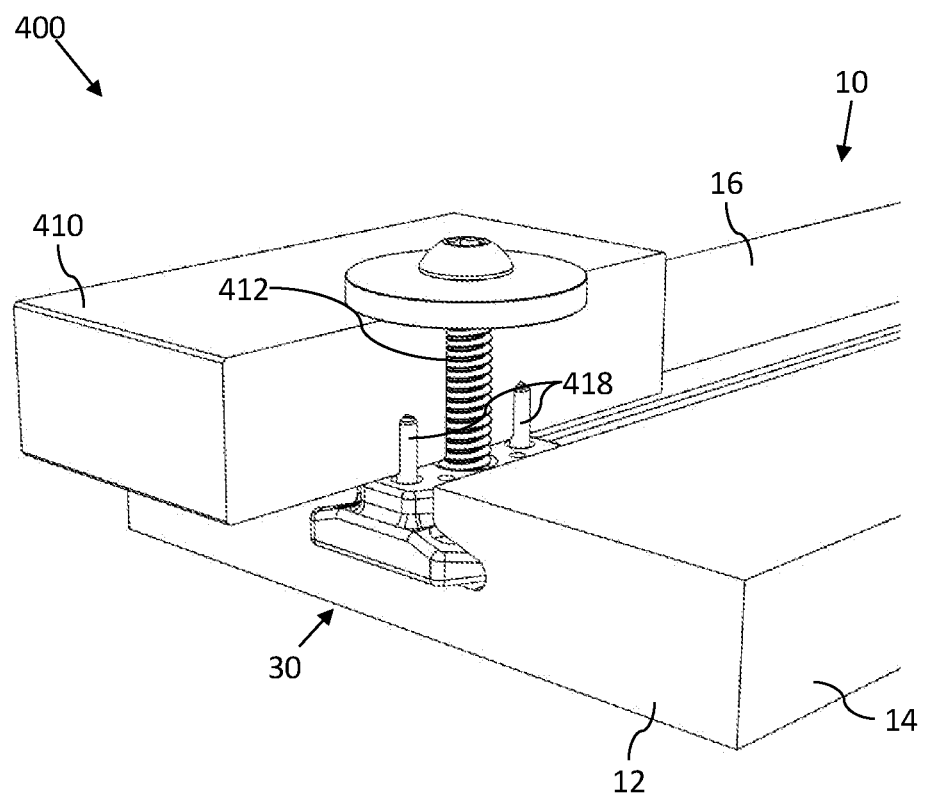
FIG. 4B illustrates fixture system 400 including a portion of woodworking table 10 including T-nut 30, a sectioned view of fixture 410, and T-slot 19.

FIGS. 4A and 4B illustrate a fixture system 400 including a portion of woodworking table 10 including T-nut 30, a fixture 410, and T-slot 19. T-nut 30 and wooden T-slot 19 include geometries optimized specifically for wood-based fixturing slot materials. A threaded fastener 412 passes through a fixture 410, via an aperture 414, and into bore 55 of T-nut 30. When tightened, threaded fastener 412 engaging threaded bore 55 forces clamping surfaces 72 of clamping wings 43 against inner surfaces 90 of T-slot overhangs 85, immobilizing fixture 410. Additionally, when tightened, threaded fastener 412 engaging threaded bore 55 forces fixture 410 downwardly into contact with top surface 16 of table 10, further ensuring the immobilization of fixture 410 relative to table 10.

Spine 40 of T-nut 30 fits slidably into central section 80 of T-slot 19 between inwardly directed faces 83. Spine 40 provides structural rigidity to T-nut 30, positive lateral positioning relative to table 10, a threaded bore 55 for fastener 412, and sockets 57 for anti-rotation pins 416.

One or more anti-rotation pin 416 may extend between one or more T-nut socket 57 and one or more fixture socket 418. One or more anti-rotation pin 416 is configured to eliminate rotation between T-nut 30 and fixture 410. Anti-rotation pin 416 may be an unthreaded dowel pin configured to be fastened or captured into one or more T-nut socket 57 and one or more fixture socket 418, parallel to fastener 412's longitudinal axis, and free to slide in one or both of T-nut socket 57 and fixture socket 418.

In practice, T-nut 30 is attached to fixture 410 loosely, but with engagement of one or more anti-rotation pin 416 in both one or more T-nut socket 57 and one or more fixture socket 418. Anti-rotation pin(s) 416 act as linear guide(s) for T-nut 30 as fastener 412 rotates and causes T-nut 30 to move toward or away from fixture 410. As such, T-nut 30 when oriented on the bottom of fixture 410 is simple to align with T-slot 19 by a user whose vantage point is above fixture 410. Where fixture 410 includes multiple T-nuts 30, as is common for larger fixtures 410, anti-rotation pin(s) 416 keep T-nuts 30 oriented in the same direction, parallel to T-slots 19, thus making the simultaneous sliding of multiple T-nuts 30 into multiple T-slots 19 quite easy. If T-nuts 30 were permitted to rotate, keeping multiple T-nuts 30 aligned for insertion into multiple T-slots 19 is often complicated and difficult. Once fixture 410 is placed where desired relative to table 10, with engagement of each T-nut 30 with the appropriate T-slots 19, fastener 412 is tightened to cause clamping surfaces 72 of clamping wings 43 to engage with inner surfaces 90 of T-slot overhangs 85, immobilizing fixture 410.

Prior art T-nuts, as well as other fasteners commonly used in T-slots, have no anti-rotation pins and thus no means of orientation control until captured by a T-slot. As a practical matter, this means that the person installing a fixture must hold the fixture with one hand, while reaching beneath it with the other hand, typically blindly, to orient the T-nut or fastener head for insertion into the T-slot. For fixtures with a single T-nut or fastener, this procedure is unnecessarily slow and awkward. Larger fixtures, however, may have four or more T-nuts or fasteners, typically with pairs of T-nuts/fasteners needing to enter parallel T-slots simultaneously. For such fixtures, positive T-nut orientation control dramatically increases the speed and ease of fixture installation.

Figure 5A:
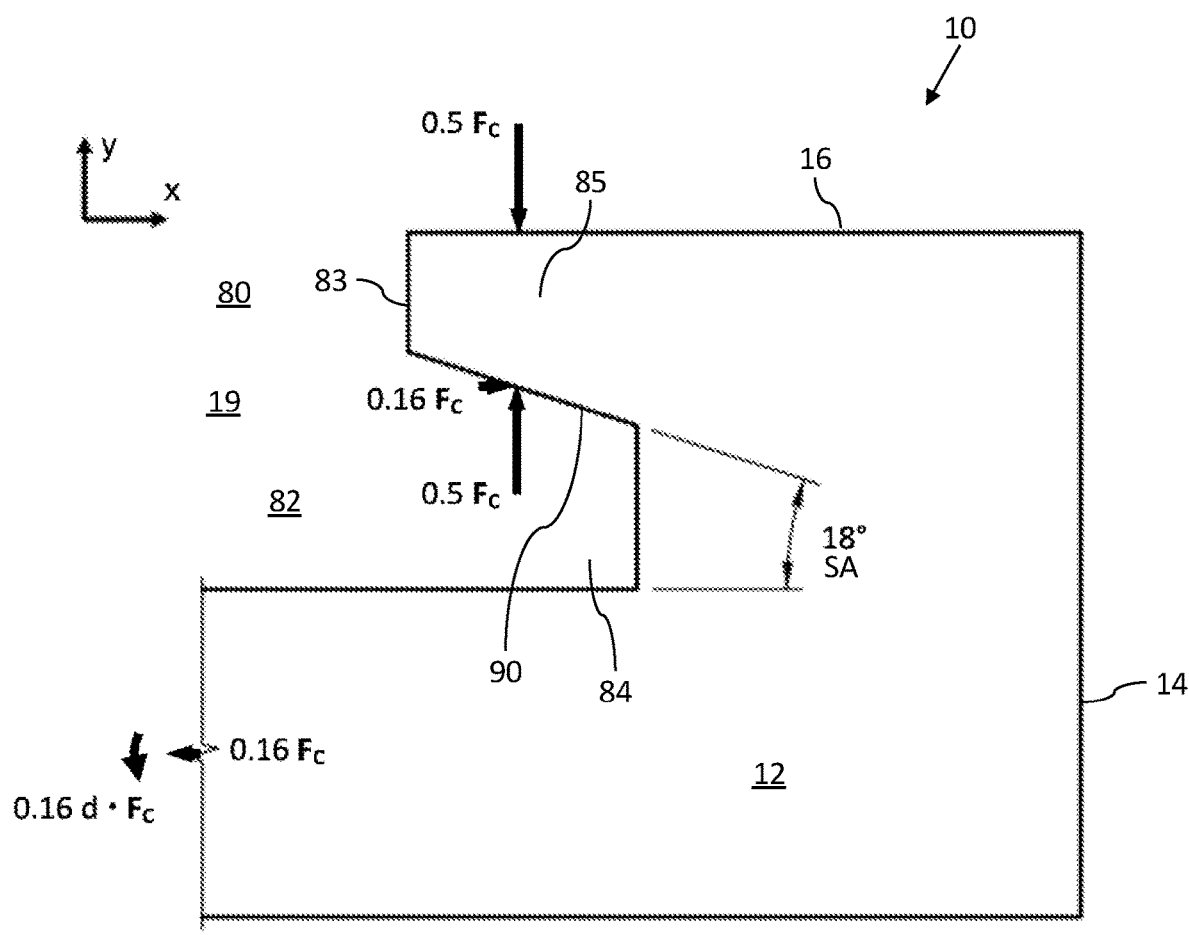
FIG. 5A illustrates a free-body diagram of T-slot 19.

FIG. 5A is a free-body diagram of T-slot 19 illustrating the forces and moments imparted into table 10 during clamping of a fixture (not shown). T-slot 19 includes inner surfaces 90 oriented at an angle SA equal to 18 degrees. A force of 0.5 $F_c$ is directed downward onto top surface 16 by a fixture (not shown), which is counteracted by a force of 0.5 $F_c$ directed upward onto inner surface 90 by a clamping wing (not shown). The clamping wing (not shown) also imparts a force of 0.16 $F_c$ laterally onto inner surface 90, which is counteracted by a force 0.16 $F_c$ laterally within the thin section remaining beneath T-slot 19. Finally, the clamping wing (not shown) imparts a moment equal to 0.16d $F_c$ within the thin section remaining beneath T-slot 19, where d is the vertical distance from the center of the thin section to the center of pressure of the clamping wing.

Figure 5B:
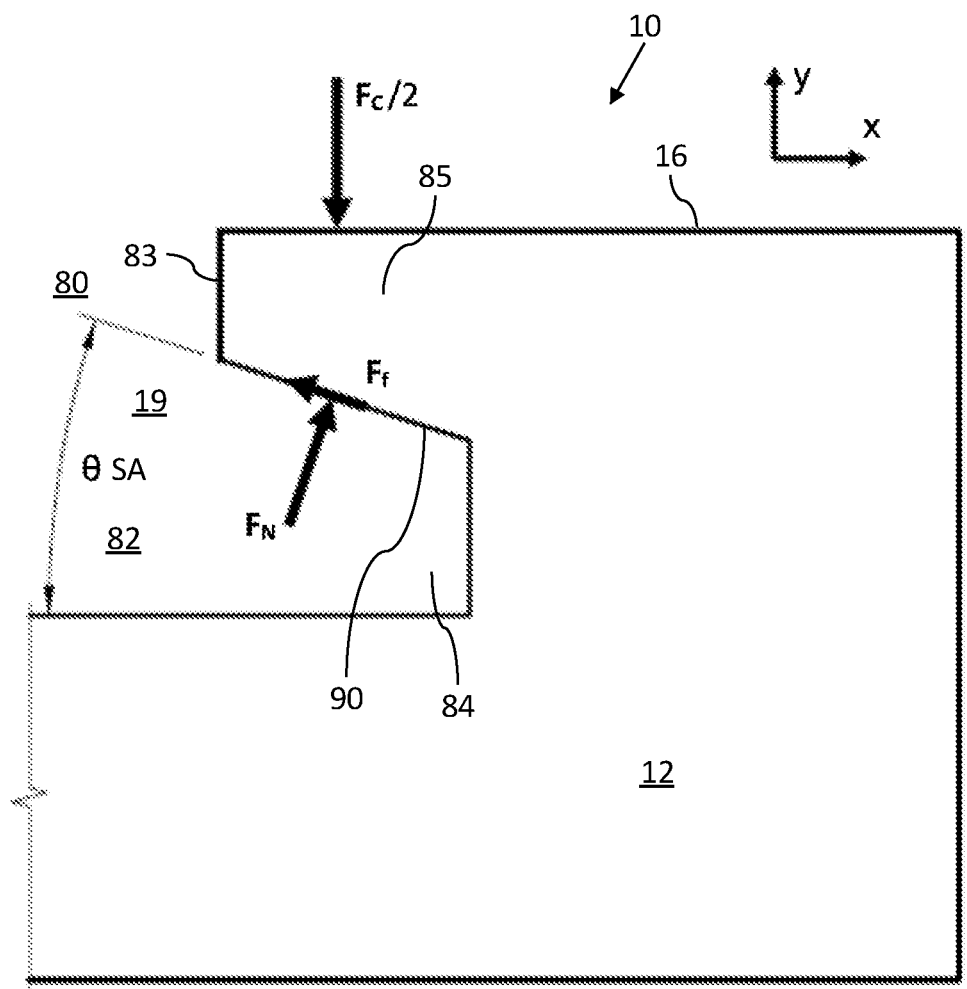
FIG. 5B illustrates another free-body diagram of T-slot 19.

FIG. 5B is a free-body diagram of T-slot 19 illustrating the forces and moments imparted into T-slot overhang 85 during clamping of a fixture (not shown). Table 10 is considered to be non-rigid for this analysis, thus the free-body diagram represents a single T-slot overhang 85, to which ½ of the clamping force $F_c$ is applied. Forces $F_N$ and $F_f$ are the normal force and the friction force, respectively, applied by T-nut clamping wing 43.

Derivation of the clamping wing wedging-threshold angle $\theta_w$ includes:

$$\Sigma F_X = F_N \sin(\theta) - F_f \cos(\theta) = 0; \qquad 1)$$

$$F_f = \mu \cdot F_N \{\text{at the onset of sliding}\}; \qquad 2)$$

$$F_N \sin(\theta_W) = \mu \cdot F_N \cos(\theta_W); \qquad 3)$$

$$\mu = \sin(\theta_W)/\cos(\theta_W) = \tan(\theta_W); \qquad 4)$$

$$\tan(\varphi) = \tan(\theta_W); \text{ and} \qquad 5)$$

$$\theta_W = \varphi. \qquad 6)$$

When the clamping wing angle WA is less than the friction angle, friction forces proportional to the clamping force oppose any sliding of the clamping wings 43 on T-slot overhangs 85. T-nut 30 then functions as a brace that ties together the opposing T-slot overhangs 85, stiffening table 10 in bending about T-slot 19. Stated differently, T-nut 30 acts to tie T-slot overhangs 85 rigidly together, rather than to spread them apart from one another.

Figure 5C:
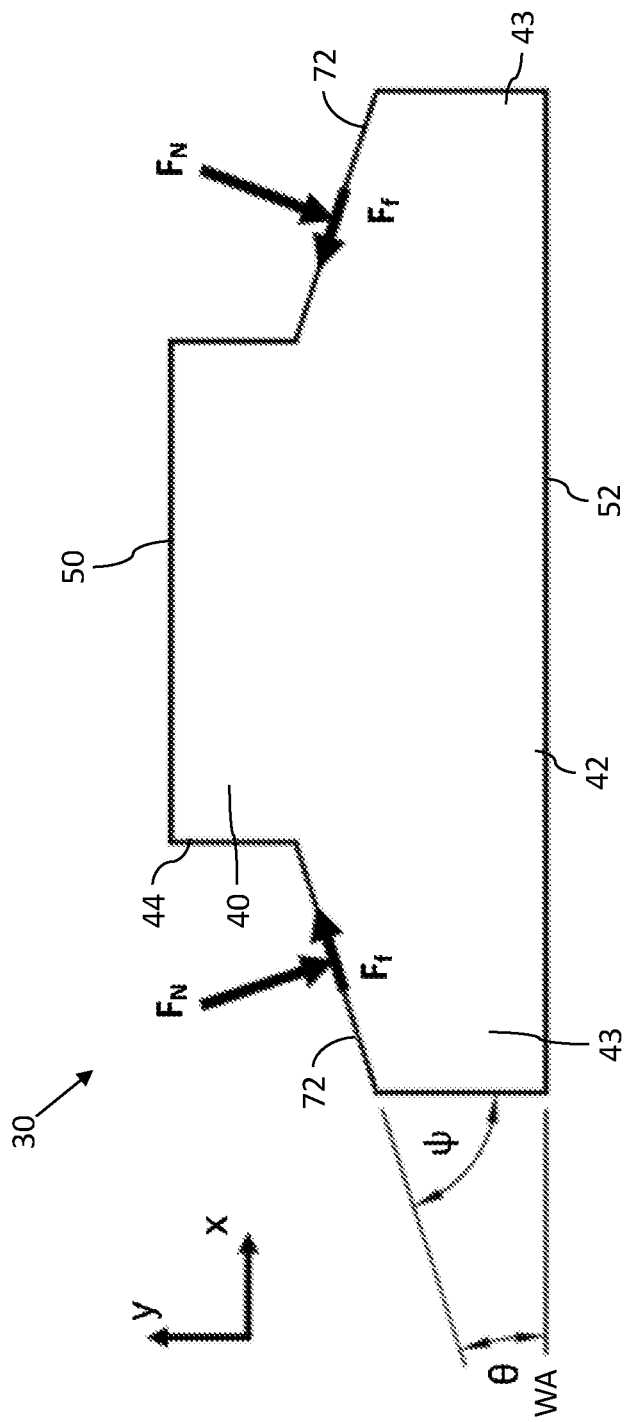
FIG. 5C illustrates a free-body diagram of T-nut 30.

FIG. 5C is a free-body diagram of T-nut 30. Wing angle WA must be less than, or equal to, the complement of the static friction angle. This ensures that T-nut 30 will always self-release when the clamping-screw force is removed from T-nut 30. That is, T-nut 30 will not become jammed in T-slot 19.

As illustrated in FIG. 5C, a free-body diagram depicts the forces acting on T-nut 30, just after the clamp screw force has been removed. $F_N$ and $F_f$ are the normal forces and the friction forces, respectively, applied by T-slot overhang 85.

Due to the symmetry of T-nut 30 and T-slot 19, the vector magnitudes are equal on each clamping wing 43.

Derivation of the clamping wing self-releasing threshold angles $\psi_{SR}$ and $\theta_{SR}$ includes:

$$\Sigma F_Y = 2 \cdot F_f \cos(\psi) - 2 \cdot F_N \sin(\psi) = 0; \quad 1)$$

$$F_f = \mu \cdot F_N \{\text{at the onset of sliding}\}; \quad 2)$$

$$\mu \cdot F_N \cos(\psi_{SR}) = F_N \sin(\psi_{SR}); \quad 3)$$

$$\mu = \sin(\psi_{SR})/\cos(\psi_{SR}) = \tan(\psi_{SR}); \quad 4)$$

$$\tan(\varphi) = \tan(\psi_{SR}); \quad 5)$$

$$\psi_{SR} = \varphi; \quad 6)$$

$$\theta_{SR} = 90° - \psi_{SR} = 90° - \varphi. \quad 7)$$

The clamping-wing angle WA must be large enough to create strong profile sections in both the clamping wings 43 and the T-slot overhangs 85. Given that both T-nuts 30 and T-slots 19 are made from materials that are much weaker than steel, the right-angle profiles of conventional metal T-nuts are very suboptimal. Applying a downward angle to clamping surfaces 72 of clamping wings 43, however, creates a tapered cross-section both in clamping wings 43 and in T-slot overhangs 85. This increases the root thickness of both structural elements, thereby greatly increasing their clamping-load capacity, without increasing the overall height of T-nut 30 or T-slot 19.

In one embodiment, T-slot overhang 85 includes a minimum thickness of inwardly directed faces 83, and thus a T-nut spine height SH above clamping wings 43, of ⅛". The measured static friction angle of the chosen reinforced-plastic T-nut 30 material on hardwood ranges from approximately 18 degrees to 20 degrees. An 18 degree friction angle corresponds to a minimum coefficient of friction of μ=Tan (18 degrees)=0.32. The complement of the measured friction angle ranges from 70 degrees to 72 degrees. An 18 degree clamping angle (angles WA and SA) satisfies both friction-angle requirements, creates adequately strong profile sections, and consumes only 0.25"*tan(18°)=0.081" of the T-nut 30's height budget. This leaves 0.375"-0.125"-0.081"=0.169" of the T-nut 30's height budget for fillets at the roots of clamping wings 43 and T-slot overhangs 85. These fillets reduce the stress concentrations at the interior corners, and thus enable higher clamping forces. As an 18 degree clamping-wing angle WA is approximately equal to the static friction angle, it will only brace T-slot 19 to a small degree. If a greater bracing effect is desired, however, a high-friction texture may be molded into T-nut 30's clamping surfaces 72, thereby increasing the coefficient of friction and the static friction angle without increasing T-nut 30's production cost.

In the free-body diagrams described below with respect to FIGS. 5D-5F, fixturing-plate sections are shown for prior-art designs. The thin section of the fixturing plate/woodworking table is considered non-rigid for this analysis, so each free-body diagram shows a single fixturing-slot overhang, to which ½ of the clamping force $F_c$ is applied (physically, by the object being clamped). Arrows represent the force vectors acting on the fixturing-slot overhang, as well as any resulting internal force and bending moment at the center of the fixturing plate's thin section. For simplicity, friction forces are neglected in these free-body diagrams.

The sum of the Y-axis forces must equal zero. Thus $F_Y = \frac{1}{2} F_c$. $F_X = F_N \sin(\theta)$; $F_Y = F_N \cos(\theta)$; $=>F_X/F_Y=\tan(\theta)$; where $F_N$ is the force normal to the clamping surface. $F_x = F_Y \tan(\theta) = \frac{1}{2} \tan(\theta) F_c$. The sum of the moments about the center of the thin section must equal zero. Thus $M_H = d \cdot F_X = \frac{1}{2} d \cdot \tan(\theta) F_c$, where d is the vertical distance from the center of the thin section to the center of pressure of the clamping wing.

Figure 5D:
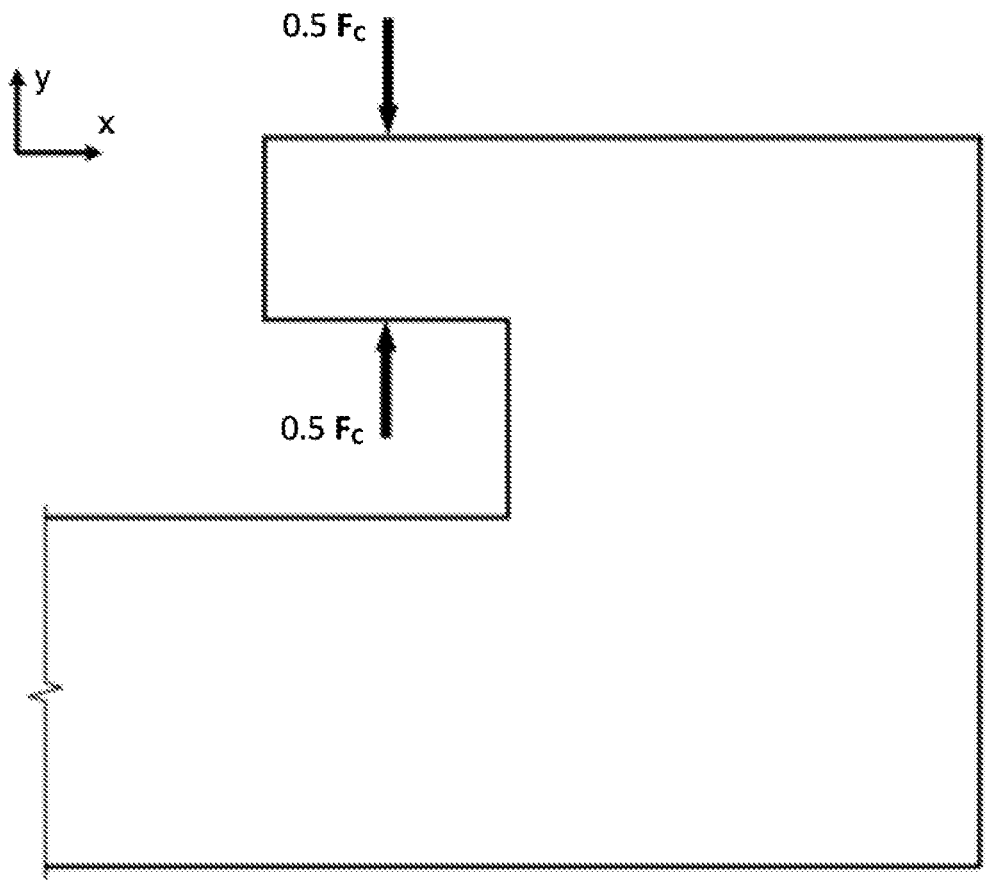
FIG. 5D illustrates a free-body diagram of a prior art T-slot.

FIG. 5D is a free-body diagram of a prior art T-slot. This prior art T-slot includes a 0 degree clamping angle, which is consistent with standard machine tool T-slots, but is a poor choice for use in wooden fixturing plates/woodworking tables. The clamping area ratios of standard machine-tool T-slot nuts range from 1.8:1 to 4.3:1. These nuts are intended for use in metal T-slots, where larger surface areas are not required.

Figure 5E:
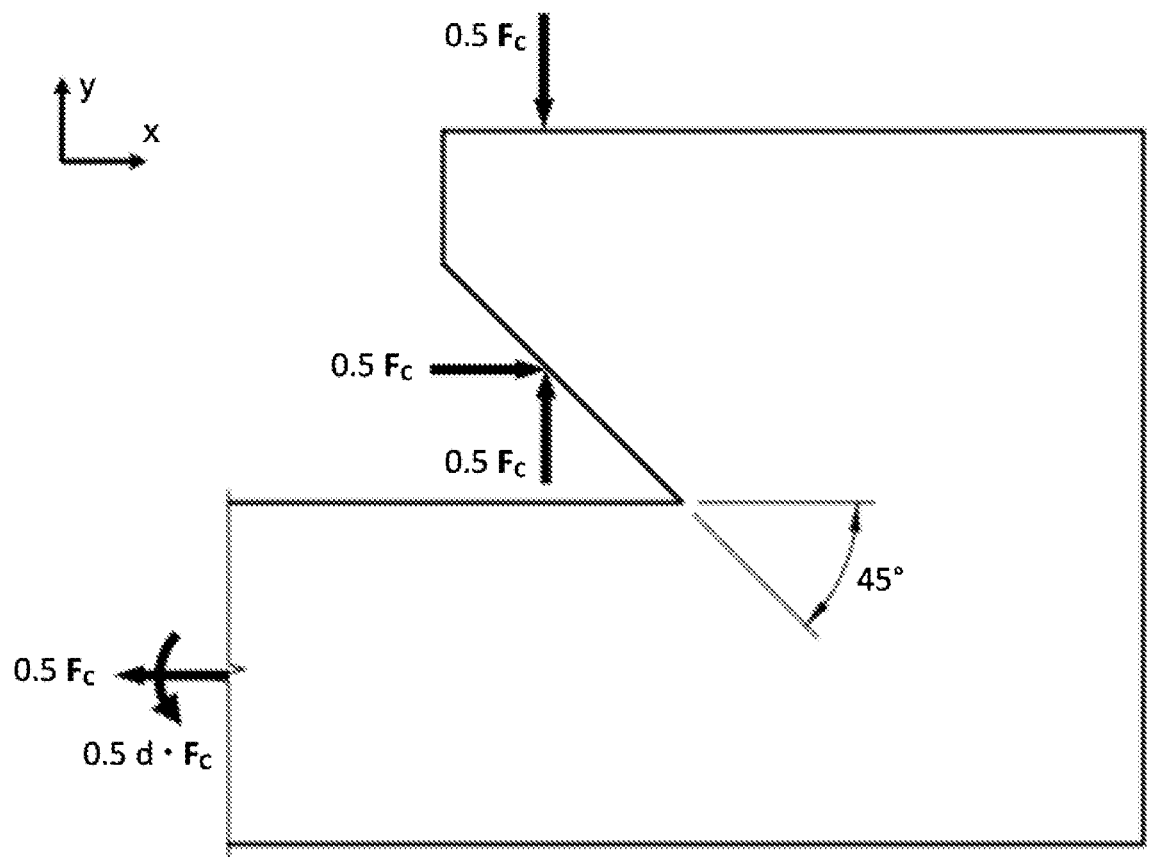
FIG. 5E illustrates a free-body diagram of a prior art dovetail slot.

FIG. 5E is a free-body diagram of a prior art dovetail slot. This prior art fixturing slot includes a 45 degree clamping angle. This high degree clamping angle will act to spread fixturing slot overhangs apart, resulting in a large bending moment in the thin section remaining beneath the fixturing slot, and large lateral forces that may exceed the strength of a wood-based fixturing slot.

Figure 5F:
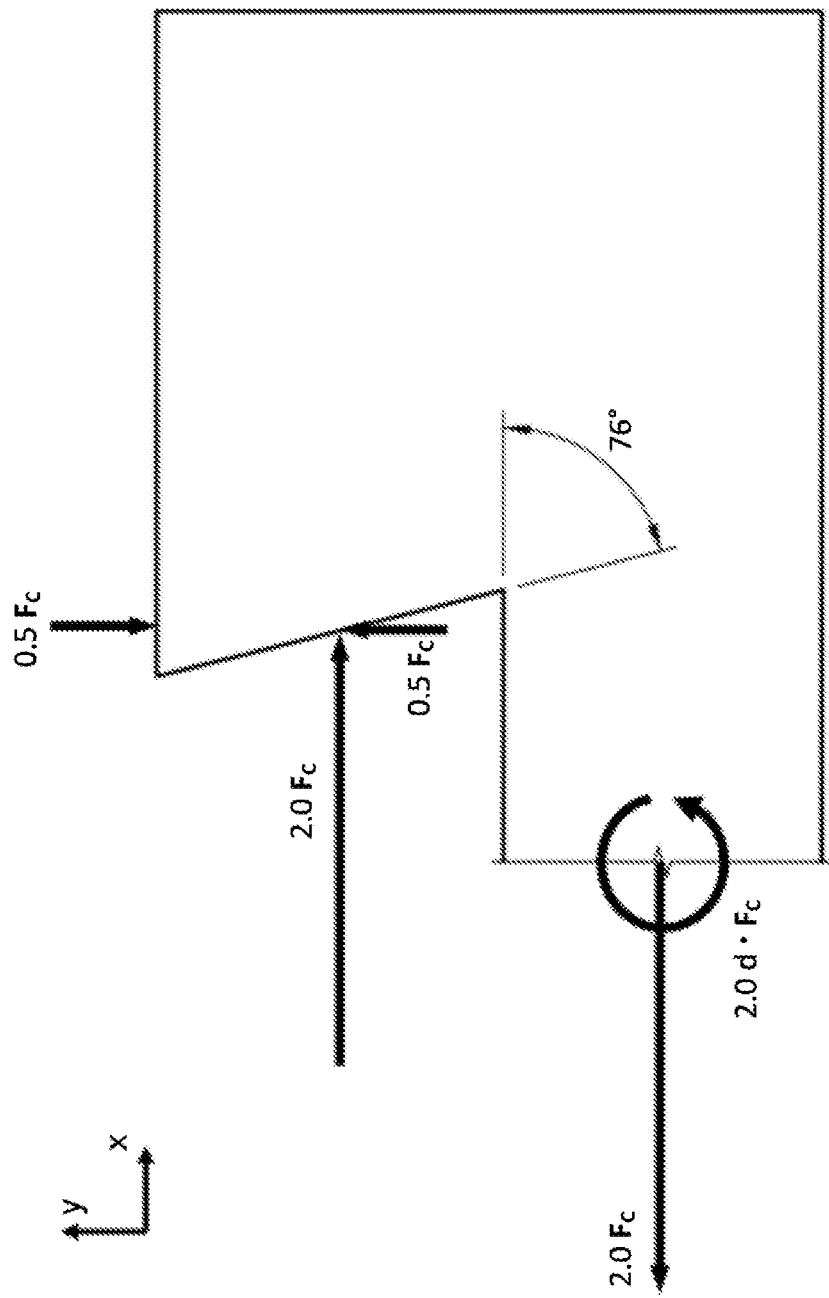
FIG. 5F illustrates a free-body diagram of a prior art dovetail slot.

FIG. 5F is a free-body diagram of a prior art dovetail slot. This prior art fixturing slot includes a 76 degree clamping angle. This high degree clamping angle will act to spread fixturing slot overhangs apart, resulting in a large bending moment in the thin section remaining beneath the fixturing slot, and large lateral forces that may exceed the strength of a wood-based fixturing slot. This high degree clamping angle yields lateral forces on the fixturing slot that are up to four times greater than the clamping force. This high degree clamping angle may also cause the nuts to jam in the fixturing slot, requiring significant force to remove it from the fixturing slot.

The steep clamping-wing angles used in the above prior-art examples have serious shortcomings when used with relatively thin woodworking tables/fixturing plates made of wood-based materials. Most critically, steep clamping-surface angles create a strong wedging effect, which tends to spread open the top of the fixturing slot when clamping forces are applied. Because the fixturing slot depth is typically about half the thickness of a ¾" (or an 18 mm) thick fixturing plate, the fixturing plate's thin-section bending stiffness is reduced by a factor of about eight. Any net bending moment resulting from applying a clamping force to the fixturing-slot nut will bow the thin section.

Example 1—Wedging of Nut and Bowing of Fixture Plate

Tests were conducted to identify wedging of the nut within the slot and bowing of the fixture plate. A 2"×2"×18 mm Baltic birch plywood pressure pad was clamped to fixturing slots milled into wooden test specimens. The pad had a central ¼" clearance hole for threaded fasteners. To reduce fixture-friction effects, UHMW polyethylene tape was bonded to the bottom of the pad. The pressure pad was then clamped to the test specimen using a ¼"-20 threaded fastener and a 1⅛" diameter×⅛" thick load-distribution washer. The test specimen was placed in a fixture that constrained its motion in the horizontal plane only.

The test specimens were formed from Baltic birch plywood having 13 plies. The test specimens were 6" long and 3" wide. The face-grain orientation was lateral. The slot orientation was lateral. The slot position was centered on the specimen.

TABLE 1

Wedging and Bowing Test Data

Test data

| Subtest ID | Wing angle (degrees) | Torque applied (in-lb.) | Approximate clamping force (lb.) | Specimen measured bow (in.) | Thin-section thickness (in.) | Thin-section width (in.) | Thin-section relative stiffness (calculated) | Stiffness-adjusted bow (in.) | Fixturing nut jammed? (y/n) | Comments |
|---|---|---|---|---|---|---|---|---|---|---|
| A | 45 | 40 | 880 | 0.027 | 0.232 | 1.000 | 100% | 0.027 | No | |
| B | 18 | 40 | 880 | 0.005 | 0.254 | 1.000 | 131% | 0.007 | No | |
| C | 76 | 40 | 880 | 0.024 | 0.298 | 0.500 | 424% | 0.102 | Yes | Unjamming force ~85 lbf. |

As illustrated, nuts with wing angles of 45 degrees, 18 degrees, and 76 degrees were tested. A torque of 40 in.-lb. was applied to the ¼"-20 threaded fastener, resulting in a clamping force of approximately 880 lbs. As illustrated, the nut (T-nut 30) having an 18 degree wing angle exhibited about ⅕ of the measured bow of the 45 degree and 76 degree wing angle nuts. The 18 degree wing angle nut exhibited about ¼ of the stiffness adjusted bow as the 45 degree wing angle nut, and about 1/14 of the stiffness adjusted bow as the 76 degree wing angle nut. Finally, the 76 degree wing angle nut was jammed within its fixturing slot, requiring about 85 lbs. of force to dislodge it.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include 10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A T-nut device configured to reduce clamping pressures and bending moments imposed on mating T-slots that are machined directly into relatively weak wood-based materials, comprising:
   an outer portion including a screw-threaded bore;
   an inner portion with a pair of clamping surfaces projecting from opposite sides of the outer portion;
   wherein the clamping surfaces are inclined so as to project inward relative to the outer portion at angles of inclination between 5 degrees and 30 degrees,
   wherein the clamping surfaces are formed of plastic,
   wherein the T-nut is configured for use with a wood-based T-slot material, and
   wherein the clamping surface angles of inclination are less than or equal to a static friction angle of the plastic clamping surfaces on the wood-based T-slot material.

2. The T-nut device of claim 1, wherein the clamping surfaces are inclined so as to project inward relative to the outer portion at angles of inclination between 10 degrees and 25 degrees.

3. The T-nut device of claim 1, wherein the clamping surfaces are inclined so as to project inward relative to the outer portion at angles of inclination between 15 degrees and 20 degrees.

4. The T-nut device of claim 1, wherein the screw-threaded bore has a nominal cross-sectional area for receiving a threaded fastener, and the clamping surfaces on the T-nut have a combined surface area of at least about 10 times the nominal cross-sectional area of the bore.

5. The T-nut device of claim 1, wherein the outer portion further comprises a plurality of unthreaded sockets.

6. The T-nut device of claim 1, further comprising anti-rotation pins oriented in the plurality of unthreaded sockets.

7. A T-nut device configured to reduce clamping pressures and bending moments imposed on mating T-slots that are machined directly into relatively weak wood-based materials, comprising:
   an outer portion including a screw-threaded bore and a plurality of unthreaded sockets;
   an inner portion with a pair of clamping surfaces projecting from opposite sides of the outer portion; and
   wherein the clamping surfaces are inclined so as to project inward relative to the outer portion at angles of inclination between 5 degrees and 30 degrees.

8. The T-nut device of claim 7, wherein the clamping surfaces are inclined so as to project inward relative to the outer portion at angles of inclination between 10 degrees and 25 degrees.

9. The T-nut device of claim 7, wherein the clamping surfaces are inclined so as to project inward relative to the outer portion at angles of inclination between 15 degrees and 20 degrees.

10. The T-nut device of claim 7, wherein the screw-threaded bore has a nominal cross-sectional area for receiving a threaded fastener, and the clamping surfaces on the T-nut have a combined surface area of at least about 10 times the nominal cross-sectional area of the bore.

11. The T-nut device of claim 7, wherein the clamping surfaces are formed of plastic.

12. The T-nut device of claim 7, wherein the T-nut is configured for use with a wood-based T-slot material, and wherein the clamping surface angles of inclination are less than or equal to a static friction angle of the plastic clamping surfaces on the wood-based T-slot material.

13. A T-nut device configured to reduce clamping pressures and bending moments imposed on mating T-slots that are machined directly into relatively weak wood-based materials, comprising:
an outer portion including a screw-threaded bore;
an inner portion with a pair of clamping surfaces projecting from opposite sides of the outer portion;
wherein the clamping surfaces are inclined so as to project inward relative to the outer portion at angles of inclination between 5 degrees and 30 degrees,
wherein the clamping surfaces are formed of plastic,
wherein the T-nut is configured for use with a wood-based T-slot material, and
wherein the strength of the plastic clamping surfaces is greater than the strength of the wood-based T-slot material.

14. The T-nut device of claim 13, wherein the clamping surfaces are inclined so as to project inward relative to the outer portion at angles of inclination between 10 degrees and 25 degrees.

15. The T-nut device of claim 13, wherein the clamping surfaces are inclined so as to project inward relative to the outer portion at angles of inclination between 15 degrees and 20 degrees.

16. The T-nut device of claim 13, wherein the screw-threaded bore has a nominal cross-sectional area for receiving a threaded fastener, and the clamping surfaces on the T-nut have a combined surface area of at least about 10 times the nominal cross-sectional area of the bore.

17. The T-nut device of claim 13, wherein the outer portion further comprises a plurality of unthreaded sockets.

18. The T-nut device of claim 13, further comprising anti-rotation pins oriented in the plurality of unthreaded sockets.

19. The T-nut device of claim 13, wherein the T-nut is configured for use with a wood-based T-slot material, and wherein the clamping surface angles of inclination are less than or equal to a static friction angle of the plastic clamping surfaces on the wood-based T-slot material.

\* \* \* \* \*